(12) United States Patent
Bondioli

(10) Patent No.: US 6,186,901 B1
(45) Date of Patent: Feb. 13, 2001

(54) CARDAN TRANSMISSION SHAFT, IN PARTICULAR OF TELESCOPIC TYPE, WITH PROTECTIVE SLEEVE AND PROTECTIVE BOOTS FOR THE END FORKS

(76) Inventor: Edi Bondioli, Via Gina Bianchi 18, 46028 Suzzara, Mantova (IT)

( * ) Notice: Under 35 U.S.C. 154(b), the term of this patent shall be extended for 0 days.

(21) Appl. No.: 09/242,513
(22) PCT Filed: Jul. 28, 1997
(86) PCT No.: PCT/IT97/00192
§ 371 Date: Feb. 12, 1999
§ 102(e) Date: Feb. 12, 1999
(87) PCT Pub. No.: WO98/06956
PCT Pub. Date: Feb. 19, 1998

(30) Foreign Application Priority Data

Aug. 14, 1996 (IT) .............................. FI96A0095

(51) Int. Cl.[7] ................. F16C 3/06; F16C 1/26
(52) U.S. Cl. ............................ 464/162; 464/172
(58) Field of Search ................. 464/162, 106, 464/112, 113, 114, 134, 136, 172, 905, 170

(56) References Cited

U.S. PATENT DOCUMENTS

| 3,053,062 | * | 9/1962 | Geisthoff | 464/162 |
| 3,080,731 | * | 3/1963 | Atkinson | 464/162 |
| 3,091,101 | * | 5/1963 | Atkinson | 464/162 |
| 3,136,140 | * | 6/1964 | Atkinson | 464/162 |
| 4,107,952 | * | 8/1978 | Geistoff | 64/32 |
| 4,411,636 | * | 10/1983 | Buthe et al. | 464/172 |
| 4,435,166 | * | 3/1984 | Bondioli | 464/172 |
| 4,443,207 | * | 4/1984 | Buthe et al. | 464/172 |
| 4,747,804 | * | 5/1988 | Benzi | 464/170 |
| 5,580,314 | * | 12/1996 | Moriyama et al. | 464/162 |
| 5,772,521 | * | 6/1998 | Herchenbach et al. | 464/170 |
| 5,800,271 | * | 9/1998 | Herchenbach et al. | 464/172 |
| 5,902,186 | * | 5/1999 | Gaukel | 464/162 |
| 5,971,858 | * | 10/1999 | Aurora | 464/172 |

* cited by examiner

Primary Examiner—Lynne H. Browne
Assistant Examiner—Kenneth Thompson
(74) Attorney, Agent, or Firm—McGlew and Tuttle, P.C.

(57) ABSTRACT

The protective means is supported by means of sliding blocks (53) which can slide in to annular channels (37, 39) formed in the base of each of the two forks (29, 31); the base (29A) of the fork (29) is formed with a circular cross section essentially as far as the arms (29B) of the fork, and the channel (37) for the annular sliding block (53) is recessed in said base (29A) adjacently to said arms (29B) of the fork, between these and the pin (33) locking the shaft to the fork (29).

13 Claims, 9 Drawing Sheets

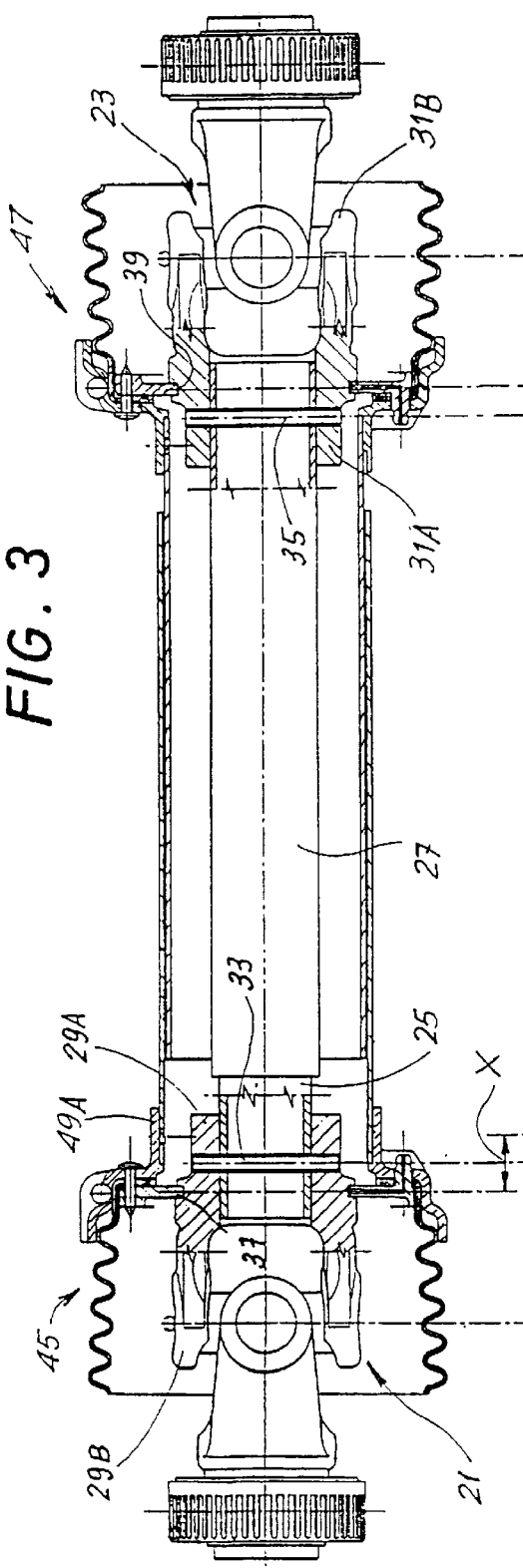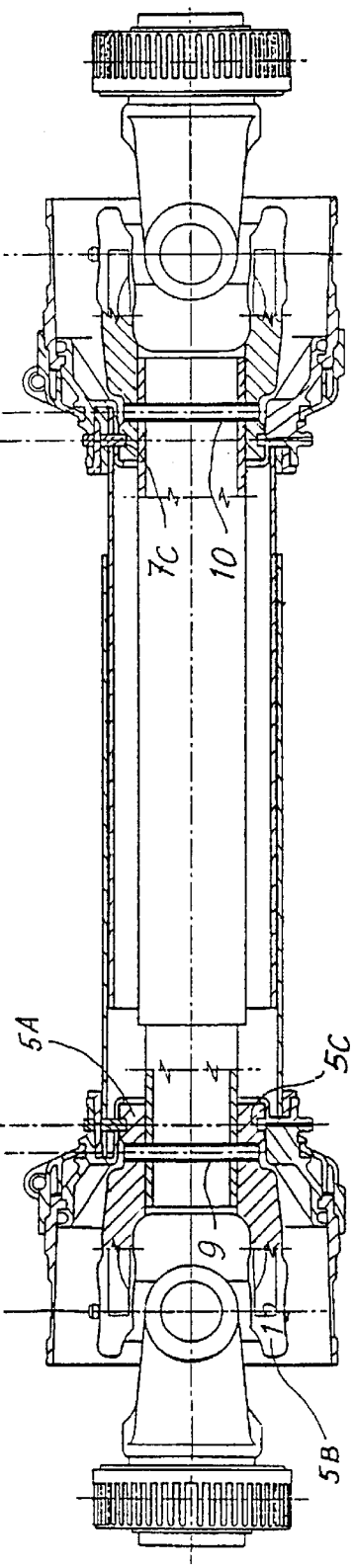

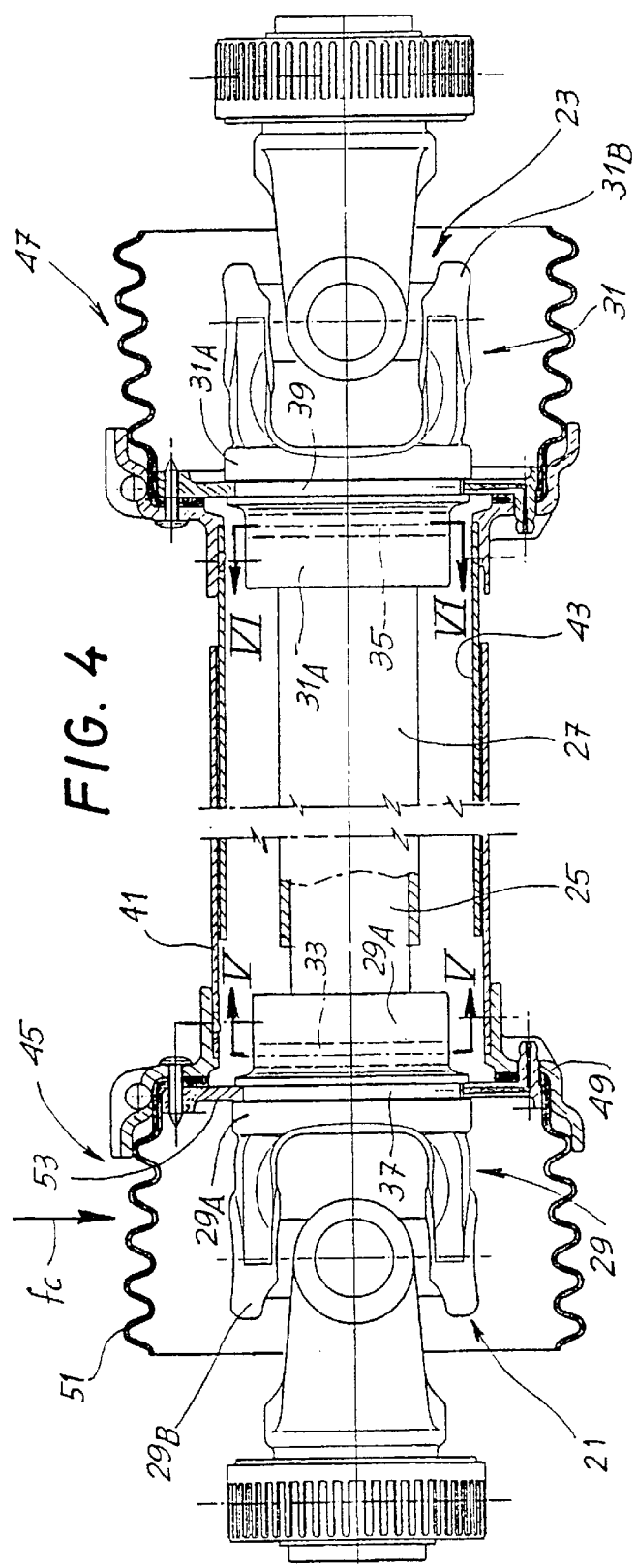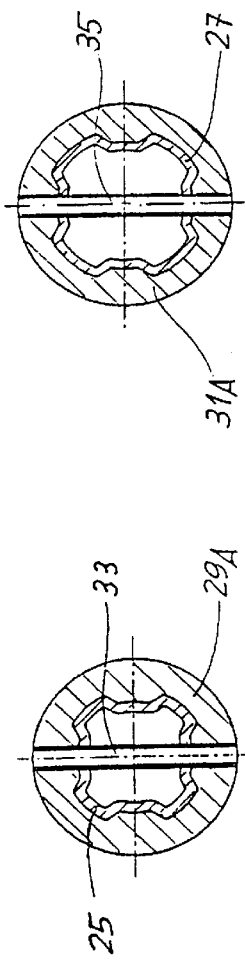

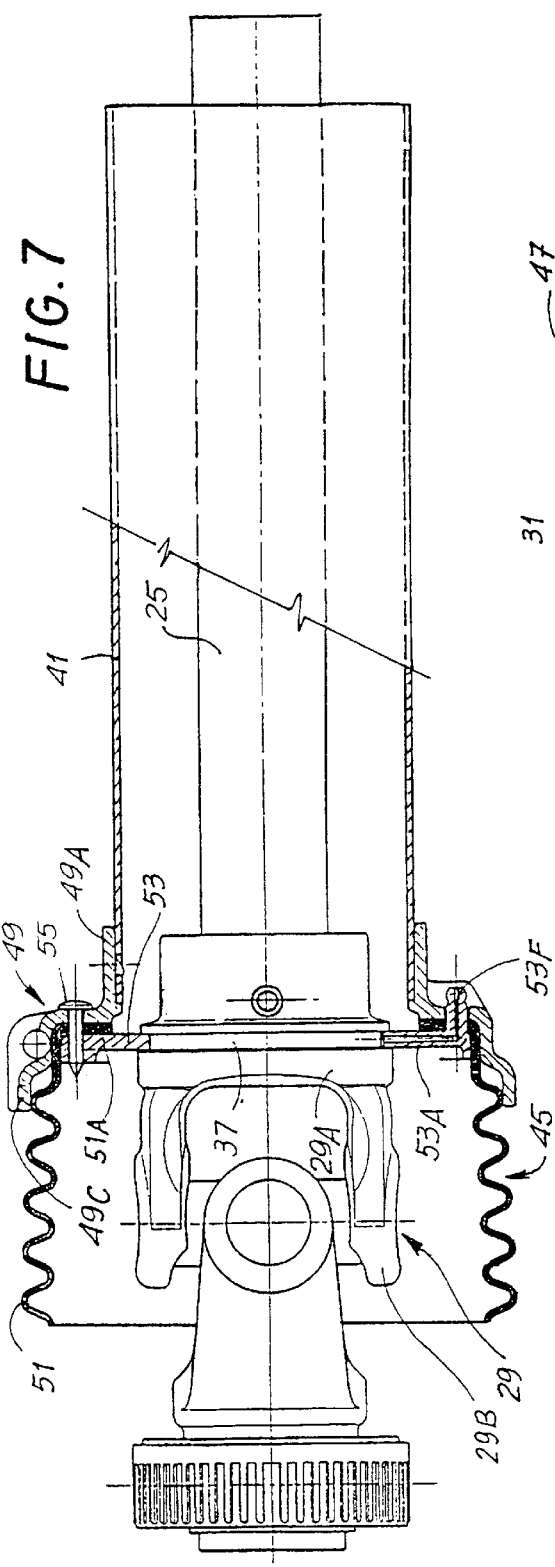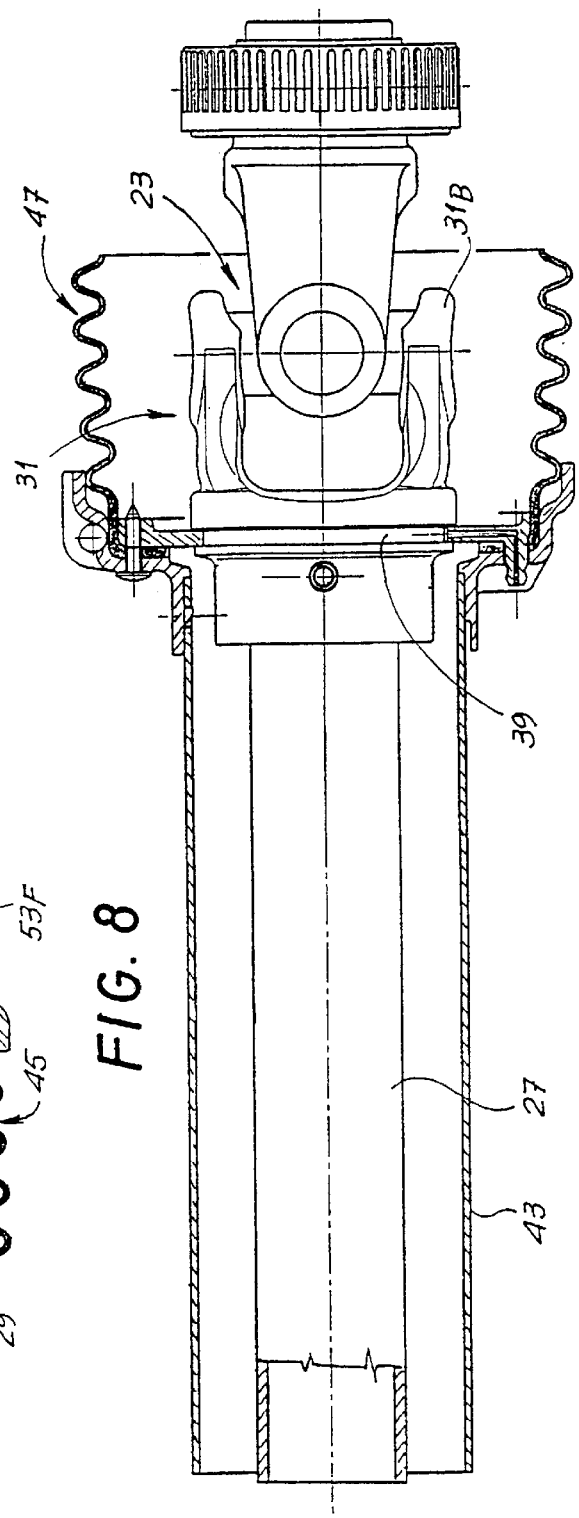

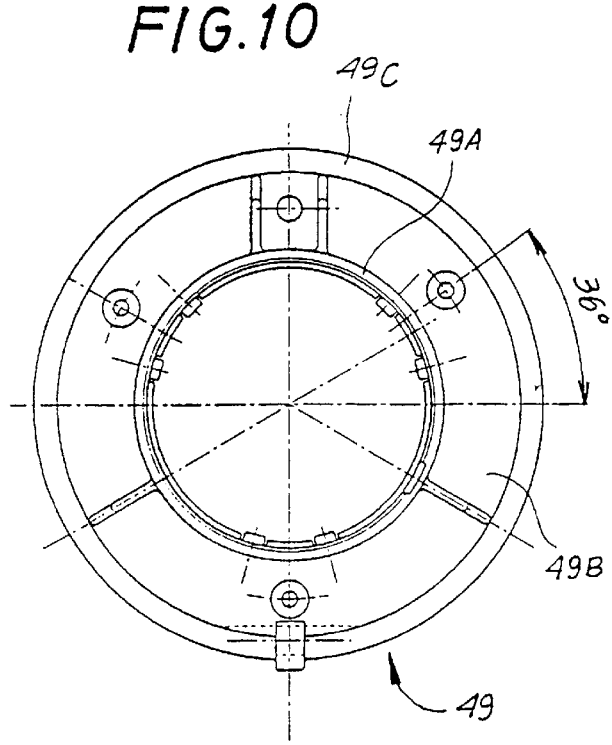
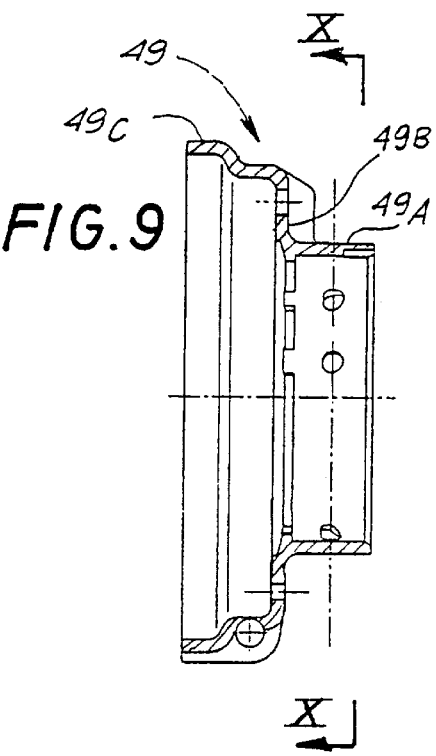
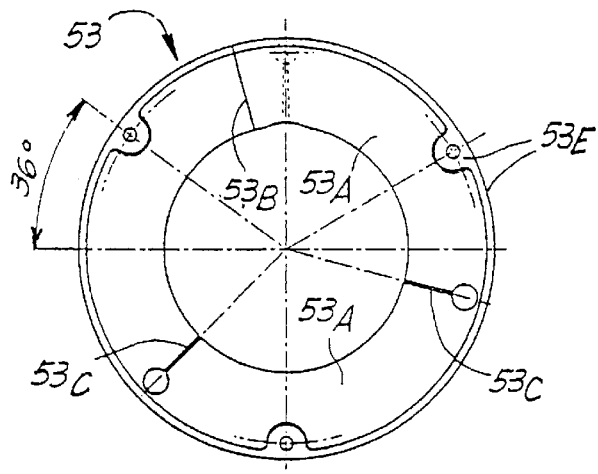
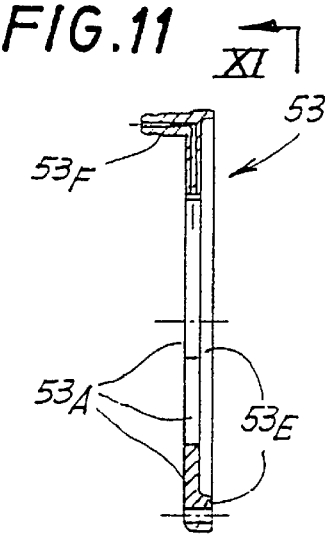

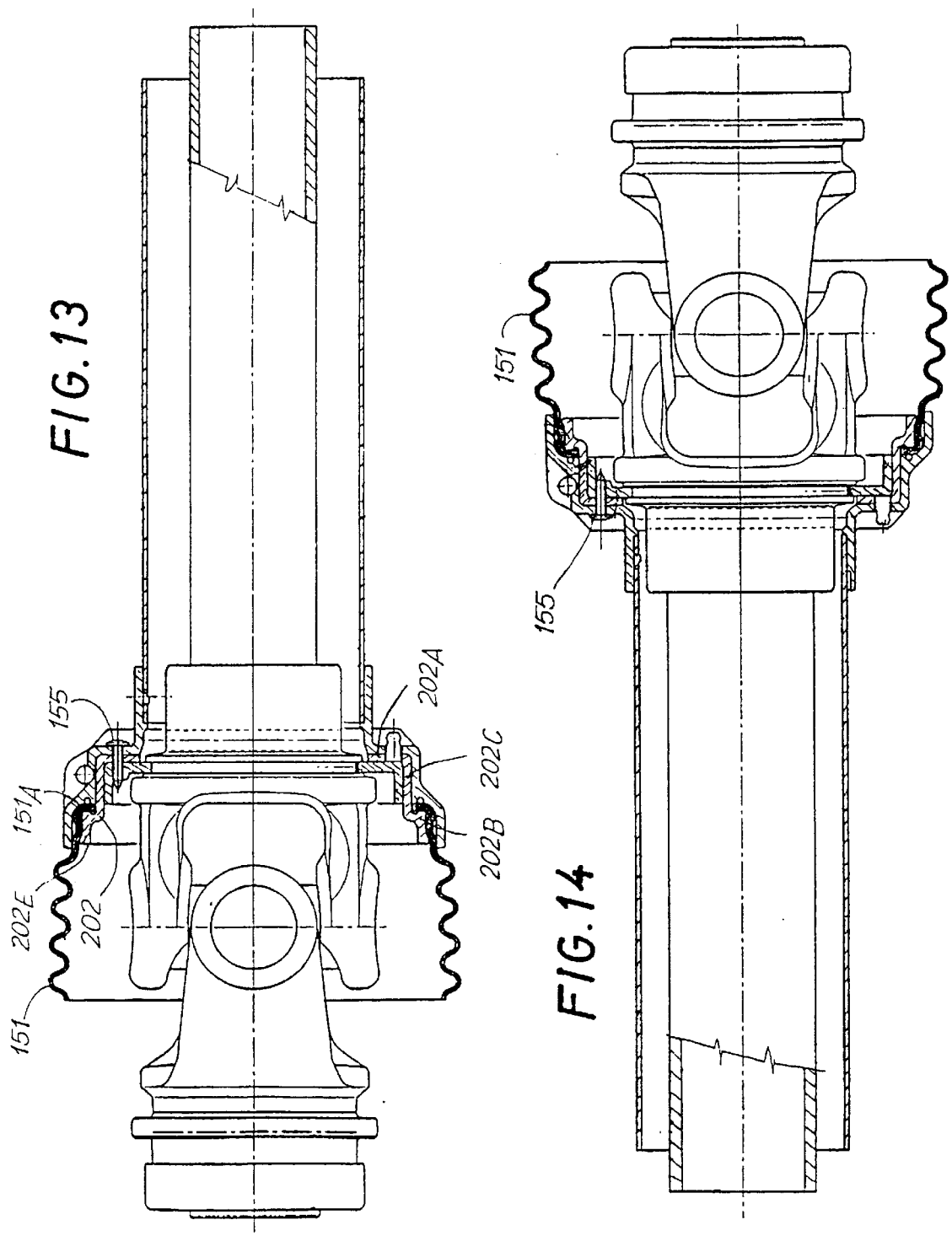

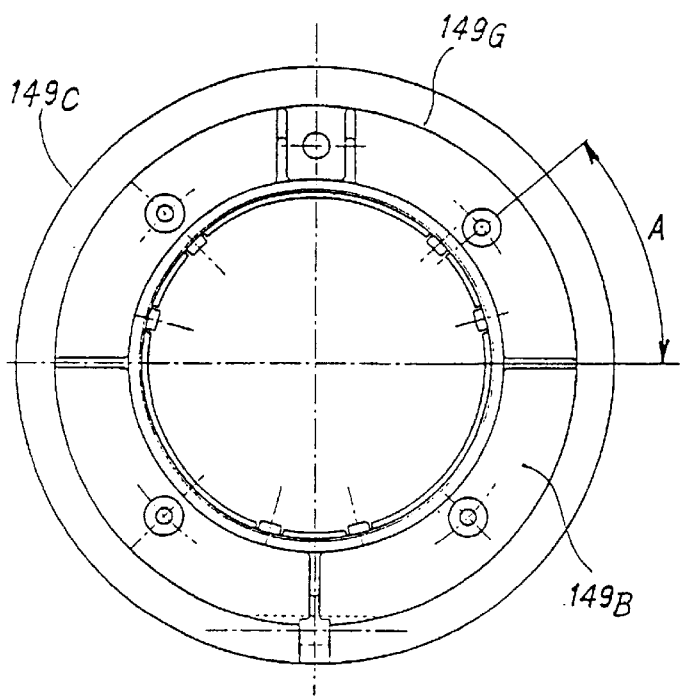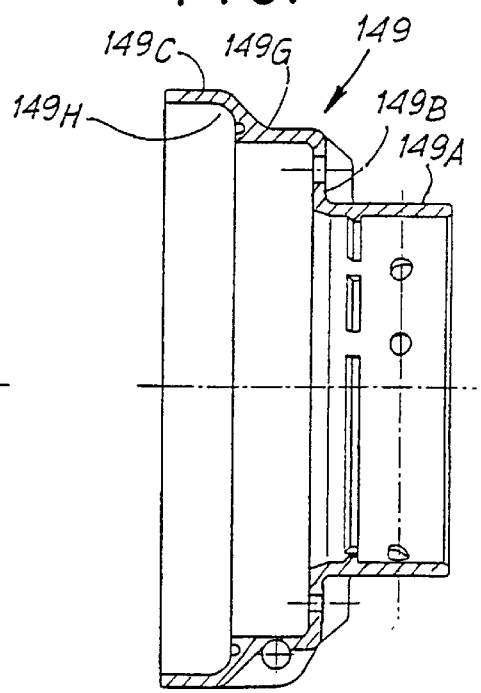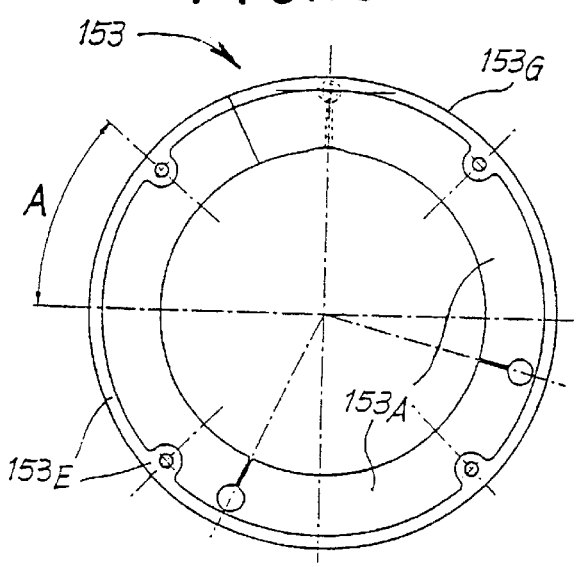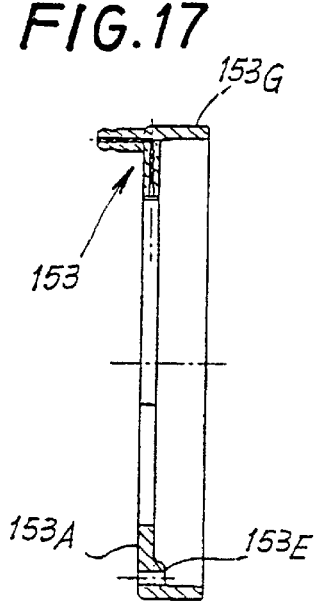

US 6,186,901 B1

CARDAN TRANSMISSION SHAFT, IN PARTICULAR OF TELESCOPIC TYPE, WITH PROTECTIVE SLEEVE AND PROTECTIVE BOOTS FOR THE END FORKS

FIELD OF THE INVENTION

Accident-prevention standards are becoming increasingly stringent in every field and therefore also—and in particular—in the case of mechanical transmissions which are exposed as are (in the field of agricultural machinery in particular) cardan shafts—in particular of telescopic type—which already have protective means comprising a telescopic sleeve around the shaft and protective boots for the end forks of the shaft which form part of the respective cardan joints. In general, such a protective means is supported by sliding block means which can slide in an annular channel formed in the base of each of said two forks, in which base the respective tubular segment of the telescopic shaft is inserted.

BACKGROUND OF THE INVENTION

In conventional solutions, such as that illustrated in FIGS. 1 and 2 (see for example FR-A-2.507.266 and FR-A-2.218.501), the two segments 1 and 3 of the shaft—which have a non-circular profile and the possibility of sliding in relation to one another—are connected to forks 5 and 7 respectively by means of pins 9 and 10 respectively, which pass through axial seats formed in the forks 5 and 7, in which seats the ends of the segments 1 and 3 respectively are received. These seats can have a shape corresponding to that of the segments 1 and 3 for angular coupling. On the outside of the bases 5A and 7A of the forks 5 and 7, that is to say at the opposite end to the arms 5B and 7B of the forks, there is an annular channel 5C and 7C respectively, which channels partly contain sliding blocks 12A and 14A respectively which form part of protective boots 12 and 14 for the cardan joints of which the forks 5 and 7 respectively form part. Integral with the protective boots 12 and 14 are protective sleeves 16 and 18 respectively which are coupled in a telescopically slidable manner and which are connected rotatably to the boots 12 and 14 respectively. By preventing the protective means constituted by the boots 12 and 14 and by the tubular sleeves 16 and 18 from rotating, the shaft constituted by the forks 5 and 7 and by the segments 1 and 3 can rotate, the surfaces of the channels 5C and 7C sliding relative to the sliding blocks 12A and 14A which support the protective means 12, 16, 18, 14 defined above. The sliding blocks 12A and 14A which support the protective sleeve on the rotating shaft are located practically at the ends of the forks and at the ends of the associated protective boots. The supports of the boots 12 and 14—which are constituted by these sliding blocks 12A and 14A—are therefore positioned virtually at the inner end of the respective protective boots 12 and 14 which project unsupported from the support sliding blocks 12A and 14A over the forks 5 and 7 and therefore over the cardan joints of which the arms 5B and 7B of the forks 5 and 7 form part. It follows from this that a load bearing down in the direction of arrow fc has to be supported directly by the structure of the respective boot such as 12 which in this case tends to be deformed until it actually comes into contact with the arms of the fork such as 5B of the fork 5, the result of which is a dangerous tendency of the shaft to pull round with it all the protective means constituted by the boots and by the sleeves, thus neutralizing the protective effect. The most recent standards aimed at countering the danger of accidents provide for stringent tests to prevent the abovementioned risks, and the aim of the invention is to modify the conventional structures represented in FIGS. 1 and 2 in order to achieve greater protective effectiveness of the protective sleeves without greatly affecting the robustness and other strength characteristics which otherwise have to be provided exclusively by the shape of the boots. These and other aims and advantages will become clear from reading the following text.

SUMMARY AND OBJECTS OF THE INVENTION

Essentially, according to the invention, the base of the fork is formed with a circular cross-section essentially as far as the arms of the fork itself and the channel for the sliding block means is recessed in said base adjacently to said arms of the fork. In practice, said annular channel is formed between the arms of the fork and the diametral pin connecting the segment of the shaft to the base of the fork.

A protective boot for the cardan joint can comprise: a rigid annular component with a collar for engagement on the tubular component of the sleeve, a front wall with an end rim forming a support, a flexible skirt with an inner flange, and a flat-ring element forming the sliding block means. Said inner flange and said flat-ring element are fixed against said front wall. Such a protective means can also comprise a second, reinforcing rigid annular component.

The flat-ring element advantageously has a radial cut and radial slits and is fixed around its own outer periphery to the front wall of the rigid annular component.

BRIEF DESCRIPTION OF THE DRAWINGS

The invention will be better understood by following the description and the attached drawing which shows a practical, non-limiting exemplary embodiment of the invention and in which:

FIGS. 1 and 2 show, in two different sections, the conventional solution used on cardan shafts with protective means which has already been described above;

FIGS. 3 and 4 show, in two partially sectioned views, a solution according to the invention, FIG. 4 being on enlarged scale;

FIGS. 5 and 6 show local sections on V—V and VI—VI in FIG. 4;

FIGS. 7 and 8 show, in a similar manner to FIG. 4, the two lengths of the telescopic cardan shaft separately;

FIGS. 9 and 10, and 11 and 12, show separately, in axial section and in the view on X—X in FIG. 9 and XII—XII in FIG. 11 respectively, a rigid annular component and a component forming sliding blocks for a boot in the solution shown in FIGS. 3 to 8;

FIGS. 13 and 14 show, in a similar manner to FIGS. 7 and 8, an alternative embodiment of the invention, and FIGS. 15 and 16, 17 and 18, 19 and 20, 21 and 22, and 23 and 24 show, separately and in a similar manner to FIGS. 9 to 12, components of the alternative embodiment shown in FIGS. 13 and 14.

DESCRIPTION OF THE PREFERRED EMBODIMENTS

Figure 1:
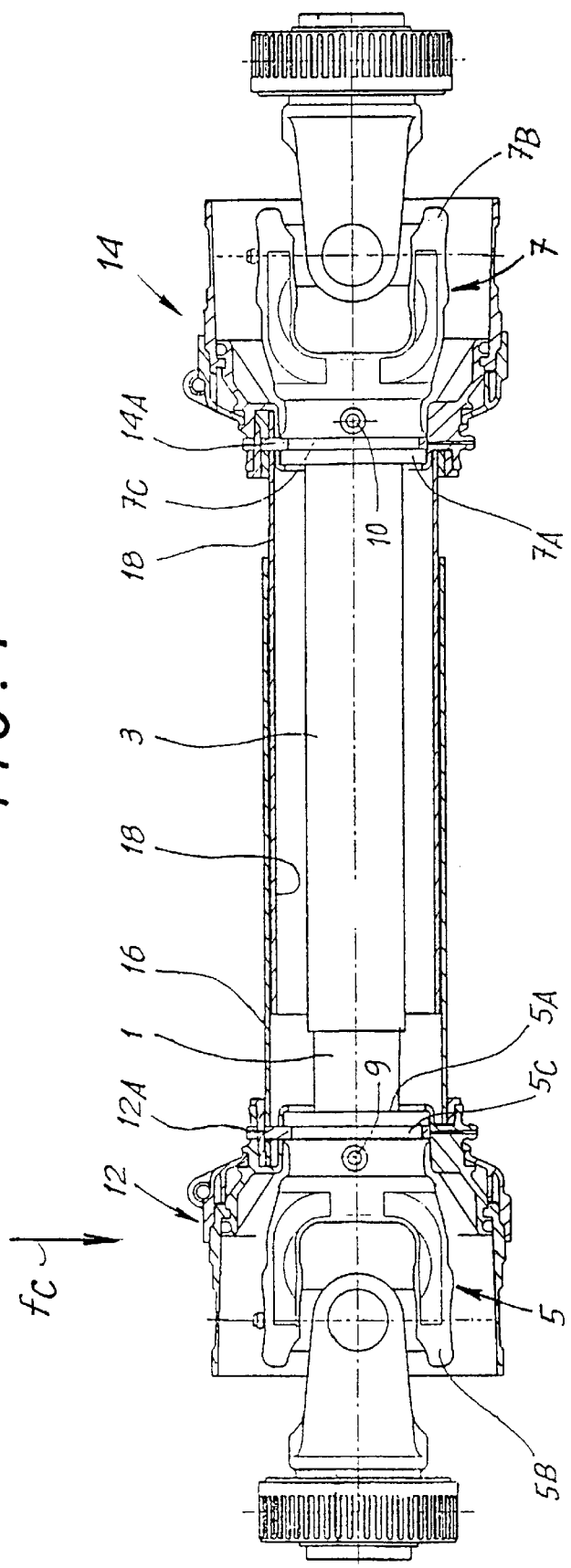

As can be seen from the attached drawing, with particular reference to FIGS. 3 to 12 initially, reference numbers 21 and 23 indicate two articulated cardan joints which form part of the cardan shaft illustrated. The shaft comprises two tubular shaft segments 25 and 27 of non-circular section which are therefore capable of being coupled angularly but with the ability to slide telescopically and which are integral with two forks 29 and 31 respectively forming part of the cardan joints 21 and 23 respectively. These segments 25 and 27 are received in axial housings formed in the base 29A of the fork 29 and in the base 31A of the fork 31 and are connected by pins 33 and 35 respectively inserted diametrically through the base 29A and 31A respectively of the fork and through the segments 25 and 27 respectively. The bases 29A and 31A respectively of the forks 29 and 31 extend with a circular cross-section as far as the arms 29B and 31B respectively of the forks 29 and 31, and channels 37 and 39 respectively are formed in said bases 29A and 31A adjacently to the root of the arms 29B and 31B. These channels 37 and 39 are therefore situated between the arms 29B and 31B and the seats for the pins 33 and 35 respectively, and therefore at a distance from the ends of the forks 29 and 31 from which the respective tubular shaft segments 25 and 27 extend.

As can be seen by comparing FIGS. 2 and 3, the annular channel 37 of the solution shown in FIG. 3 is, in comparison with the channel 5C of the conventional solution illustrated in FIGS. 1 and 2, moved through a relatively large distance X towards the cross-piece of the cardan joint 21, that is to say towards the point of cardanic articulation of the forks of the cardan joint 21, and the annular channel 39 of the base 31A of the fork 31 is likewise moved through a distance Y towards the cardan joint 23 compared with the position which this channel has in the conventional solution in FIG. 2.

The annular channels 37 and 39 serve to support the protective boots of the cardan joints 21 and 23, which boots form part of the protective means which also comprise the tubular sleeves 41 and 43 which are capable of sliding in relation to one another and simultaneously with the sliding of the segments 25 and 27.

The protective boot 45 of the cardan joint 21, which is equivalent in every way to the protective boot 47 of the cardan joint 23, is now described in detail. This protective boot has a rigid annular component 49 with a collar 49A for the insertion of the sleeve 41 (see also FIGS. 9 and 10), a flexible skirt 51 and a flat-ring element 53 (see also FIGS. 11 and 12). In addition to the collar 49A for engagement on the component 41 of the tubular sleeve, the rigid annular component 49 has a front wall 49B, also annular, and an end rim 49C which has the maximum diameter of said component 49. The flexible skirt 51 has an inner flange 51A which is received against the front wall 49B and inside the rim 49C forming the support. The flat-ring element 53 forms sliding-block means constituted by adjacent segments 53A—three in number according to the drawing (see in particular FIG. 12)—which are defined by a radial cut 53B (which interrupts the annular shape of the element 53) and by two radial slits 53C which extend from the inner edge as far as a peripheral enlargement 53E which is shaped so as to be received inside the skirt 51 against the flange 51A thereof. Reference number 53F indicates an oiler which serves to supply lubricant to the sliding blocks 53A and therefore to the channel 37. The three components 49, 51 and 53 are mounted against one another as shown clearly in FIGS. 4 and 7 and can be locked by screw means 55 or equivalent so as to constitute the complete protective boot of the cardan joint 29. It can be observed that, during assembly, the flat-ring element 53, which is made of an appropriately firm synthetic material, comes to be located in the region of the end rim 49C of the collar 49, as a result of which any load applied from the outside on the end rim 49C of the rigid component 49—such as a load of the type indicated by fc in FIG. 1—is passed on virtually directly by the sliding blocks 53A into the channel 37 and thence to the shaft, in contrast with the situation illustrated in FIG. 1, in which the load fc of an accidental external force is passed on to the unsupported part beyond the point of support provided by the sliding blocks 12A sitting in the channel 5C. The solution in FIGS. 3 to 12 thus achieves much greater rigidity than it is possible to achieve with the conventional solution in FIGS. 1 and 2.

The arrangement of the protective boot 47 is exactly the same as that described for the protective boot 45 and therefore has the same characteristics as the latter.

The structure of the protective boots such as 45 described above can be made sufficiently rigid to ensure that the conditions imposed by accident-prevention standards are respected, at least up to a certain limit of loads to be borne. The strength of these protective boots for cardan joints can moreover be increased further, as is illustrated in the alternative embodiment in FIG. 13 and the following figures. The reference numbers used for the preceding example increased by "100" are used for the corresponding parts of the variant shown in FIG. 13 and the following figures; the associated description is therefore not repeated except for the variants which are envisaged in this solution. The rigid annular component 149 has, between the front wall 149B and the end rim 149C, an essentially cylindrical zone 149G and a shoulder 149H. The flexible skirt 151 has an internal flange 151A which is capable of being pressed against the shoulder 149H instead of against the front wall 149B. A second rigid annular component 202 is provided, which has two successive transverse faces 202A and 202B and an intermediate cylindrical zone 202C which can be received inside the cylindrical zone 149G of the rigid annular component 149 while an annular element 153 forming the sliding blocks 153A (see FIGS. 17 and 18) is similar to the flat-ring element 53 but has, unlike the latter, a cylindrical wall 153G which is received inside the cylindrical zone 202C, its annular enlargement 153E bearing against the transverse face 202A. During assembly, the second rigid annular component 202 is received against the front wall 149B and within the cylindrical zone 149G, and the annular element 153 forming the sliding blocks 153A is received inside the cylindrical zone 202C and against the face 202A of the second rigid annular component 202 while the flange 151A and the portion adjacent to it of the flexible skirt 151 are held captive between the shoulder 149H and the face 202B and also inside the end rim 149C, inside which there is an annular end zone 202E which contributes to the strength of the end rim 149C and to the support of the flexible skirt 151. The components 149, 202 and 153 are held captive by clamping means 155 which pass through the front wall 149B, the zone of the peripheral enlargement of the annular element 153E and the face 202A of the second rigid annular component 202.

This arrangement makes it possible further to increase the resistance of the boot to external loads such as that indicated by the arrow fc in FIG. 1.

For certain requirements, it may be that the components of both end boots are demounted simultaneously; they then have to be reassembled correctly at the relevant end of the protective means. This is necessary in particular because one of the ends of the shaft generally remains attached to the operating machine while the other end is frequently disconnected from the power take-off of a tractor or other power unit.

Figure 20:
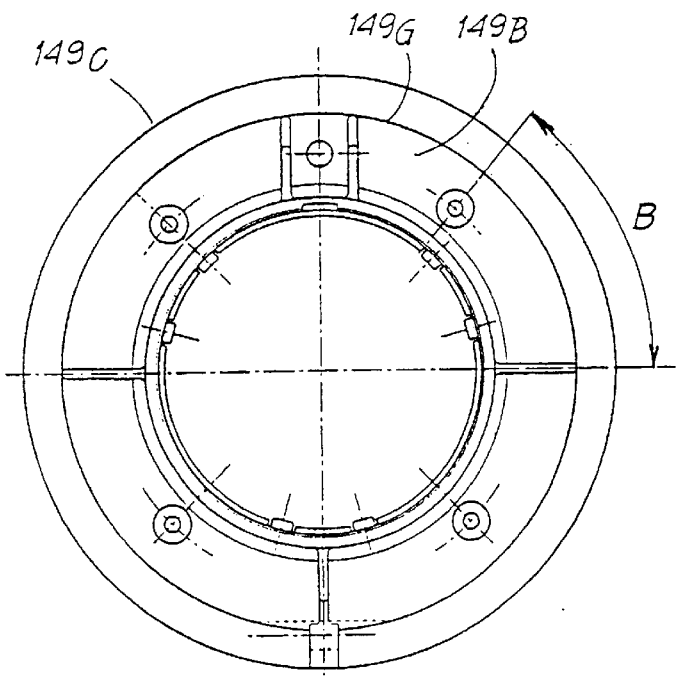
Figure 19:
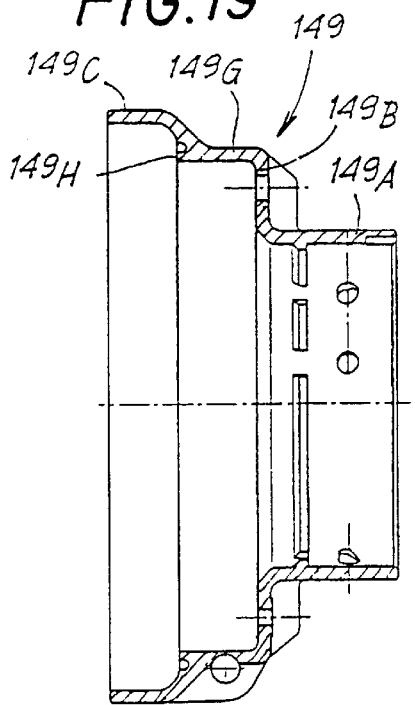
Figure 22:
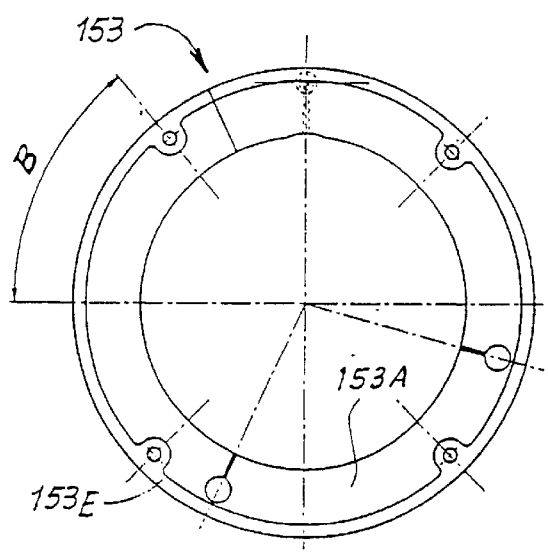
Figure 21:
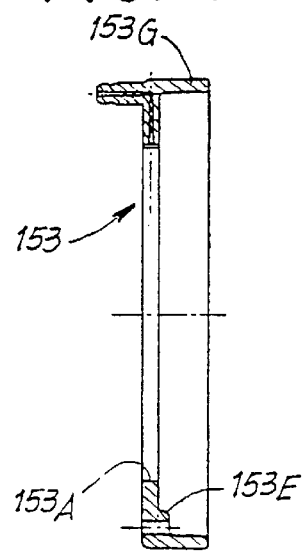
Figure 24:
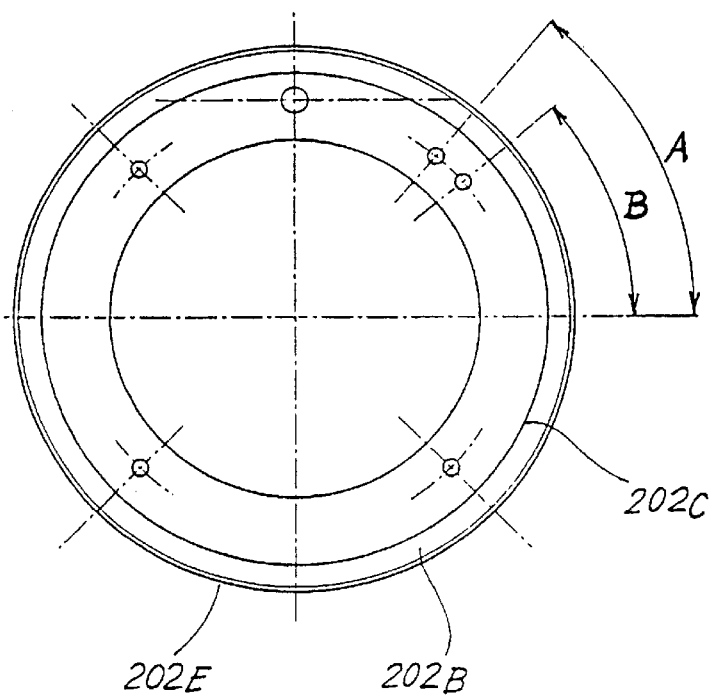
Figure 23:
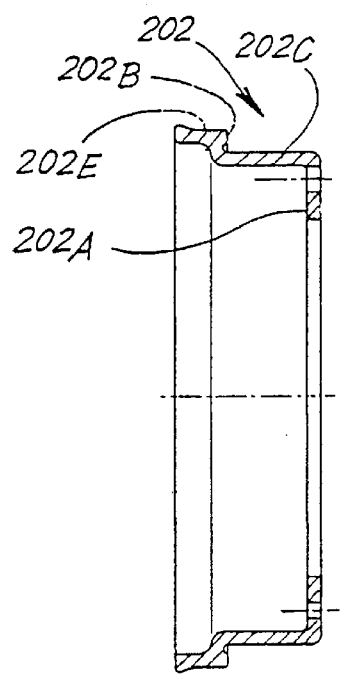

In order to achieve the aim mentioned above, the channels such as 5C and 7C are firstly made with diameters which are slightly different, and the corresponding sliding blocks (such as 53) have to have the corresponding inner diameter. In order to allow easy and correct assembly, provision is made that the components illustrated in FIGS. 15 to 18 and 23 and 24 are designed to be used for the formation of only one of the two boots. They therefore have the slots for the fixing means such as 155 for one of the two boots because one of these slots is characteristically positioned angularly in a position which forms an angle A with the horizontal diameter indicated in FIGS. 16 and 18. In FIGS. 20 and 22, the corresponding slot is positioned at an angle B to the horizontal diameter, this angle B being slightly different from the angle A, for example being 40° rather than 50° like angle A. Two slots are also provided in the component 202, one of these having the position defined by the angle A whereas the other slot is defined by the angle B. It follows from this that, while the component 202 can be used for both boots, only one of the components 149 and 153 can be used in one of the boots while only the other of the components 149 and 153 can be used in the other boot. This arrangement makes it possible to ensure the correct assembly of the various components of each of the boots.

What is claimed is:

1. A telescopic type Cardan shaft, comprising:

a telescopic shaft with shaft segments;

end forks, each of said end forks respectively forming part of a respective Cardan joint, each end fork having an annular channel formed in a base thereof, the base of each of said end forks forming the respective tubular component in which the telescopic shaft segment is inserted;

a diametral pin connecting each shaft segment to a respective one of said end forks;

a protective telescopic sleeve around said shaft;

protective boots for protecting said end forks of said shaft;

a sliding block, said protective telescopic sleeve and said protective boot being supported by said sliding block with said sliding block being slidable in said annular channel formed in the base of each of said end forks, the base of each of said end forks being formed with a circular cross-section extending essentially as far as arms of the respective fork, said annular channel for said sliding block being recessed in the base at a location adjacent to the arms of the fork, and the annular channel being formed between the arms of the fork and said diametral pin.

2. A Cardan shaft according to claim 1, wherein said protective boot comprises:

a flexible skirt with an inner flange;

a rigid annular component with a collar for engagement on said tubular component of said sleeve and a front wall with an end rim forming an external support for said flexible skirt; and a flat ring element forming said sliding block, said inner flange and said flat-ring element being fixed against said front wall.

3. A Cardan shaft according to claim 2, further comprising a second reinforcing rigid annular component capable of being received in said protective boot.

4. A Cardan shaft according to claim 1, wherein said protective boot comprises:

a first rigid annular component with a collar for engagement on said tubular component of said sleeve with a front wall, an essentially cylindrical zone, a shoulder and an end rim forming a support;

a flexible skirt with an inner flange capable of pressing against said shoulder and forming a second front wall, said skirt being disposed inwardly of said end rim;

a second rigid annular component with two successive transverse faces; and a flat-ring element forming said sliding block, said second rigid annular component and said flat-ring element being fixed against said front wall of said first rigid component, and said inner flange of said flexible skirt being held captive between said shoulder and said outermost transverse face of said second rigid component.

5. A Cardan shaft according to claim 1, wherein said flat-ring element has a radial cut and radial slits and is fixed around its own outer periphery to said front wall of said rigid annular component.

6. A Cardan shaft according to claim 2, wherein at least one of said a rigid annular component with a collar, said front wall with an end rim and said flat ring element are differentiated by angular positions and/or diameters or in other ways in order to be specific to only one or the other of the two boots.

7. A Cardan shaft according to claim 3, wherein at least one of said a rigid annular component with a collar, said front wall with an end rim, said second reinforcing rigid annular component and said flat ring element are differentiated by angular positions and/or diameters or in other ways in order to be specific to only one or the other of the two boots.

8. A Cardan shaft according to claim 4, wherein at least one of said a first rigid annular component with a collar, with a front wall, an essentially cylindrical zone, a shoulder and an end rim, said flexible skirt with an inner flange and said second front wall, said second rigid annular component with two successive transverse faces and said flat-ring element forming said sliding block are differentiated by angular positions and/or diameters or in other ways in order to be specific to only one or the other of the two boots.

9. A telescopic type Cardan shaft, comprising:

a telescopic shaft;

an end fork forming a Cardan joint, said end fork having an annular channel formed in a base thereof, the base of said end fork forming a tubular component in which said telescopic shaft is inserted;

a diametral pin connecting said shaft to said end fork;

a protective telescopic sleeve around said shaft;

a protective boot for protecting said end fork;

a sliding block, said protective telescopic sleeve and said protective boot being supported by said sliding block with said sliding block being slidable in said annular channel formed in the base of said end fork, the base of said end fork being formed with a circular cross-section extending essentially as far as arms of the fork, said annular channel for said sliding block being recessed in the base at a location adjacent to the arms of the fork, and said annular channel being formed between the arms of the fork and said diametral pin.

10. A Cardan shaft according to claim 9, wherein said protective boot comprises:

a flexible skirt with an inner flange;

a rigid annular component with a collar for engagement on the tubular component of said sleeve and a front wall with an end rim forming an external support for said flexible skirt; and a flat ring element forming said sliding block, said inner flange and said flat-ring element being fixed against said front wall.

11. A Cardan shaft according to claim 10, further comprising a second reinforcing rigid annular component capable of being received in said protective boot.

12. A Cardan shaft according to claim 9, wherein said protective boot comprises:

a first rigid annular component with a collar for engagement on the tubular component of said sleeve with a front wall, an essentially cylindrical zone, a shoulder and an end rim forming an external support;

a flexible skirt with an inner flange capable of pressing against said shoulder and forming a second front wall, said skirt being disposed inwardly of said end rim;

a second rigid annular component with two successive transverse faces; and a flat-ring element forming said sliding block, said second rigid annular component and said flat-ring element being fixed against said front wall of said first rigid component, and said inner flange of said flexible skirt being held captive between said shoulder and the outermost transverse face of said second rigid component.

13. A telescopic type Cardan shaft, comprising:

a telescopic shaft with shaft segments;

end forks, each of said end forks respectively forming part of a respective Cardan joint, each end fork having an annular channel formed in a base thereof, the base of each of said end forks forming the respective tubular component in which the telescopic shaft segment is inserted;

a protective telescopic sleeve around said shaft;

protective boots for protecting said end forks of said shaft, said protective boots each including a flexible skirt with an inner flange, a rigid annular component having a collar for engagement on the tubular component of said sleeve, a front wall with an end rim disposed outwardly of said flexible skirt, said rigid annular component forming an external support for said flexible skirt, and a flat ring element forming said sliding block, said inner flange and said flat-ring element being fixed against said front wall, said protective telescopic sleeve and said protective boot being supported by said sliding block with said sliding block being slidable in said annular channel formed in the base of each of the end forks, the base of each of the end forks being formed with a circular cross-section extending essentially as far as arms of the respective fork, said annular channel for said sliding block being recessed in the base at a location adjacent to the arms of the fork.

* * * * *

UNITED STATES PATENT AND TRADEMARK OFFICE
CERTIFICATE OF CORRECTION

PATENT NO. : 6,186,901 B1
DATED : February 13, 2001
INVENTOR(S) : Edi Bondioli

It is certified that error appears in the above-identified patent and that said Letters Patent is hereby corrected as shown below:

<u>Title page,</u>
Item [30] Foreign Application Priority Data:

Aug. 14, 1996 (IT) FI96A000195

Signed and Sealed this

Twenty-third Day of October, 2001

Attest:

*Nicholas P. Godici*

NICHOLAS P. GODICI
*Attesting Officer*  *Acting Director of the United States Patent and Trademark Office*